United States Patent [19]
Schlueter

[11] Patent Number: 5,594,659
[45] Date of Patent: Jan. 14, 1997

[54] METHOD FOR PERFORMING A VOLTAGE STABILITY SECURITY ASSESSMENT FOR A POWER TRANSMISSION SYSTEM

[75] Inventor: Robert A. Schlueter, Holt, Mich.

[73] Assignee: Michigan State University, East Lansing, Mich.

[21] Appl. No.: 605,841

[22] Filed: Feb. 22, 1996

Related U.S. Application Data

[63] Continuation of Ser. No. 236,526, Apr. 29, 1994, abandoned.

[51] Int. Cl.$^6$ .............................. G06F 15/70; H02J 3/06; H02J 3/14
[52] U.S. Cl. .......................... 364/492; 364/578; 307/18; 307/19; 307/29; 307/38
[58] Field of Search .................... 307/18, 19, 20, 307/24, 29, 31, 36, 38, 39, 41, 51, 52; 361/62, 63, 64, 65, 66, 67, 68, 107; 364/492, 483, 578

[56] References Cited

U.S. PATENT DOCUMENTS

| | | | |
|---|---|---|---|
| 3,789,201 | 1/1974 | Carpenter et al. | 364/492 |
| 3,886,330 | 5/1975 | Egelston et al. | 235/151.21 |
| 3,903,399 | 9/1975 | Enns et al. | 235/151.21 |
| 3,903,402 | 9/1975 | Petit et al. | 235/151.21 |
| 4,181,950 | 1/1980 | Carter, II | 364/492 |
| 4,324,987 | 4/1982 | Sullivan, II et al. | 364/492 |
| 4,337,401 | 6/1982 | Olson | 364/492 |
| 4,589,075 | 5/1986 | Buennagel | 364/492 |
| 4,868,410 | 9/1989 | Nakamura | 307/20 |
| 4,916,377 | 4/1990 | Terada et al. | 323/210 |
| 4,974,140 | 11/1990 | Iba et al. | 364/492 |
| 5,081,591 | 1/1992 | Hanway et al. | 364/492 |
| 5,278,772 | 1/1994 | Knupp | 364/492 |
| 5,285,395 | 2/1994 | Kamayashi | 364/492 |
| 5,323,330 | 6/1994 | Asplund et al. | 364/492 |
| 5,327,355 | 7/1994 | Chiba et al. | 364/492 |
| 5,347,466 | 9/1994 | Nichols et al. | 364/492 |
| 5,414,640 | 5/1995 | Seem | 364/492 |
| 5,422,561 | 6/1995 | Williams et al. | 323/209 |

OTHER PUBLICATIONS

Glover et al., *Power System Analysis and Design*, PWS-KENT Publishing Co., 1987, pp. 265–271.
Schlueter et al., "Improved Contingency Measures for Operation and Planning Applications", IEEE Trans. on Power Systems, vol. 4, No. 4, Oct. 1989, pp. 1430–1437.
Schlueter et al., "A Fast Accurate Method for Midterm Transient Stability Simulation of Voltage Collapse in Power Systems", Decision and Control 1989 28th Annual Conference, Dec. 1989, pp. 340–344.

(List continued on next page.)

Primary Examiner—Ellis B. Ramirez
Assistant Examiner—Eric W. Stamber
Attorney, Agent, or Firm—Brooks & Kushman, P.C.

[57] ABSTRACT

A method for performing a voltage stability security assessment for a region of an electric power transmission system having a plurality of buses and a plurality of sources of reactive reserves coupled thereto. The plurality of buses are grouped into a plurality of voltage control areas such that each of the buses within each voltage control area has a substantially similar reactive margin and voltage at the minimum of the corresponding reactive power versus voltage relationship. A corresponding reactive reserve basin is determined for each of at least one of the voltage control areas. Each reactive reserve basin comprises at least one of the sources of reactive reserves selected in dependence upon a measure of the reactive reserves depleted at a predetermined operating point of the electric power transmission system. A single contingency analysis is performed by computing a corresponding quantity for each reactive reserve basin in response to each of a plurality of single contingencies. The corresponding quantity is representative of a reduction in the reactive reserves within the reactive reserve basin. A multiple contingency analysis is performed for each reactive reserve basin using the single contingencies whose corresponding quantity exceeds a predetermined threshold.

9 Claims, 10 Drawing Sheets

OTHER PUBLICATIONS

Chen et al., "Security Analysis for Voltage Problems using a Reduced Model", IEEE Trans. on Power Systems, vol. 5, No. 3, Aug. 1990, pp. 933–940.

Chen et al., "Multi–Contingency Preprocessing for Security Assessment using Physical Concepts and CQR with Classifications", IEEE Trans. on Power Systems, vol. 8, No. 3, Aug. 1993, pp. 840–848.

Overbye et al., "Q–V Curve Interpretations of Energy Measures for Voltage Security", IEEE Trans. on Power Systems, vol. 9, No. 1, Feb. 1994, pp. 331–340.

R. A. Schlueter, "Unificat. & Classification of Algebraic Tests for Loss of Voltage Stab.", Elec. Mach. & Power Sys., Sep.–Oct., 1993, vol. 21, No. 5, pp. 557–590.

T. Lie, et al., "Method Of Identifying Weak Trans. Network Stability Boundaries", IEEE Trans. on Power Systems, vol. 8, No. 1, pp. 293–301, 1992.

R. A. Schlueter, et al., "Dynamic/Static Voltage Stability Security Criteria", Proceedings of the Bulk Power System Voltage Phenomena Seminar, Aug. 1991.

R. A. Schlueter, et al., "Methods For Determining Proximity To Volt. Collapse", IEEE Trans. on Power Systems, vol. 6, No. 2, pp. 258–292, Feb. 1991.

Robert A. Schlueter, "Voltage Stability Assessment Of The Board Of Water And Light System", Oct. 1992.

R. A. Schlueter, et al., "Voltage Collapse Security Assessment On The B.C. Hydro System", Mar. 1991.

K. L. Putta Buddhi, et al., "Decoupled Ranking Of Branch Outages Causing Limit Violations", Electric Machines and Power Systems, 18:123–136, 1990.

V. Brandwajn, et al., "Pre–Screening Of Single Contingencies Causing Network Topology Changes", IEEE Power Engineering Society, 90 SM 487–9 PWRS, 1990.

Yilang Chen, et al., "An Adaptive Pre–Filter For The Voltage Contingency Selection Function", IEEE, 1989.

G. C. Ejebe, et al., "Fast Contingency Screening And Evaluation For Voltage Security Analysis", IEEE Power Engineering Society, 88 WM 161–2, 1988.

D. G. Taylor, et al., "A Reactive Contingency Analysis Algorithm Using MW and MVAR Distribution Factors", IEEE Power Engineering Society, SP 89–149, Jul. 1989.

M. G. Lauby, et al., "Contingency Selection Of Branch Outages Causing Voltage Prob.", IEEE Power Engineering Society, 83 SM 340–7, 1983.

Yilang Chen, et al., "Direct Ranking For Voltage Contingency Selection", IEEE Power Engineering Society, 89 WM 135–5 PWRS, 1989.

John G. Raine, et al., "Power System Concepts Of Reactive Power", IEEE, 87 EH 0262–6–PWR, 1987.

D. E. Badley, "VAR Reserves And Requirements", IEEE, 87 EH 0262–6, 1987.

J. Falck Christensen, et al., "Planning Against Voltage Collapse", 1987.

A. Invernizzi, "Results Of An International Survey On Reacti. Power In Interconnected Power Sys. Part II Planning Practices For Voltage And Reactive Power Control", 1984.

M. Ernoult, et al., "React. Pwr. Comp. & Volt. Contrl. On The French EHV Sys.: Pres. Sit. & Prosp.", Intern'l Conf. on Lrg. High Vol. Elec. Sys., CIGRE 38–08, Paris 1986.

J. P. Paul, et al., "Survey Of The Second. Volt. Con. In France: Present Realiz. & Investigations", IEEE Trans. on Powr. Sys., Vol. PWRS–2, No. 2, pp. 505–511, 1987.

B. Avramovic, et al., "Real–Time Reactive Security Monitoring", IEEE Trans. On Power Systems, vol.7, No. 1, 1992.

J. Zaborszky, et al., "A Textured Model For Computationally Efficient Reactive Power Control & Mgmt.", IEEE Trans. On Power Apparat. & Sys., vol. PAS–104, No. 7, 1985.

M. Winokur, et al., "Identification Of Strong And Weak Areas For Emergency State Control", IEEE Power Engineering Society, 84 WM 022–0, 1984.

R. Navarro–Perez, et al., "Voltage Collapse Proximity Analysis Using Reactive Area Identification", 1988.

Yakout Mansour, et al., "SVC Placement Using Critical Modes Of Voltage Instability", IEEE Trans. On power Systems, vol. 9, No. 2, 1993.

G. K. Morison, et al., "Voltage Stability Analysis Using Static And Dynamic Appro.", IEEE Trans. On Power Systems, vol. 8, No. 3, 1992.

B. Gao, et al., "Voltage Stability Evaluation Using Modal Analysis", IEEE Trans. On Power Systems, vol. 7, No. 4, 1991.

R. A. Schlueter, et al., "React. Supp.: On–Line Sec. Crit.", Sec. 7, Procee. of Worksh. on Bulk Power Volt. Phenomena: Volt. Stab. & Sec. Conf., Sep. 1988.

Tjing T. Lie, et al., "Strong Controllability And Observability And Their Effects On Transient Stability Of Power Systems", IEEE Trans. on Power Systems, 1992.

Robert Schlueter, et al., "Contingency Selection", Feb. 1991, pp. 1–46.

North American Electric Reliability Council, "Survey Of The Voltage Collapse Phenomenon", 1991.

Fernando Alvarado, et al., "Suggested Techniques For Voltage Stability Analysis", IEEE Power Engineering Society, 93TH0620–5PWR, 1993.

IEEE, "Voltage Stability Of Power Systems: Concepts, Analytical Tools, And Industry Experience", IEEE, 90TH0358–2–PWR, 1990.

R. A. Schlueter, "Voltage Stability And Security Assessment", EPRI Report, EL–5967, RP–1999–8, Aug. 1988.

J. Duncan Glover, et al., "Power System Analysis and Design", PWS–Kent Publ. Co., pp. 265–271, 1987.

A. Chakrabarti, et al., "React. Power Limit. In Volt. Stab. of EHV Sys. & Its Mic.–proces. Based Online Cont.", IEEE, vol. 72, Pt.EL–1, pp. 1–6, Apr. 1991 (abstract only).

Thomas J. Overbye, et al., "Q–V Curve Interpret. Of Energy Measures For Volt. Sec.", IEEE Trans. on Power Sys., vol. 9, No. 1, pp. 331–340, Feb. 1994.

Schlueter et al., "Improved Contingency Measures for Operation & Planning Applicat.", IEEE Trans. on Power Systems, vol. 4, No. 4, Oct. 1990, pp. 1430–1437.

Schlueter et al., "A Fast Accur. Meth. for Mid. Trans. Stab. Simulat. of Volt. Colla. In Power Sys.", Pro. of the 28th Conf. On Dec. & Control, Dec. 1989, pp. 340–344.

Chen et al., "Security Analysis for Voltage Problems Using A Reduced Model", IEEE Trans. on Power Systems, vol. 5, No. 3, Aug. 1990, pp. 933–940.

Chen et al., "Multi–Conging. Preprocess. for Sec. Assess. Using Phys. Conc. & CQR w/Classifications", IEEE Trans. on Power Sys., vol. 8, No. 3, Aug. 1993, pp. 840–848.

D. Taylor, "A Reactive Contingency Analysis Algorithm Using MW and MVAR Distribution Factors", IEEE Trans. on Power Sys., vol. 6, No. 2, Feb. 1991, pp. 349–355.

L. Wehenkel et al., "Decision Tree Based Transient Stability Method A Case Study", IEEE Trans. on Power Sys., vol. 9, No. 1, Feb. 1994, pp. 459–469.

V. Quintana et al., "Partitioning Of Power Networks and Applications To Sec. Con.", IEE Proceed.–C, Generat. Transm. & Distrib., vol. 138, No. 6, Nov. 1991, pp. 535–545.

R. A. Schlueter, et al., "Applicat. Of Inertial Load To A Loss Of Gener. Postmortem", Elec. Mach. & Power Sys., 23:717–738, 1995.

J. Dorsey et al., "Global & Local Dynamic Equival. Based On Structural Archetypes For Coherency", IEEE Trans. on Power App. & Sys., vol. PAS–102, pp. 1793–1801, Jun. 1983.

J. Lawler et al., "Modal–Coherent Equivalents Derived From An RMS Coherency Measure", IEEE Trans. on Power App. & Sys., vol. PAS–90, No. 4, pp. 4151–1425, Jul./Aug. 1980.

Tzong–hih Guo, et al., "Generic Voltage–Angle Bifurcation In Load Flow Model", Proceed. of IASTED Journal on Energy Systems, 1992.

M. Lotfalian, et al., "A Stability Assessment Methodology", IEEE Trans. on Power Sys., PWRS–1, No. 4, May 1987, pp. 84–92.

R. A. Schlueter, et al., "Multiple Contin. Selec. For Transmis. Reliability & Transfer Capability Studies", Elec. Mach. & Power Sys., 20:223–237, 1992.

Tzong–yih Guo, et al., "Identification Of Generic Bifurcation And Stability Probl.", 93 SM 513–2 PWRS, IEEE Trans. on Power Sys., vol. 9, No. 2, pp. 1032–1044, 1993.

R. A. Schlueter, et al., "Types Of Volt. Instab. & The Assoc. Model For Transient/Mid–Term Stab. Simulat.", Elec. Pow. Sys. Research, 29, 1994, pp. 131–145.

R. A. Schlueter et al., "React. Supp. Volt. Stab. On EHV Trans. Netw.", Proc. of WVU/EPRI Work. on High Volt. Tra. in the Mid–Atl. Reg., EPRI Rep., pp. 1990–2010, Aug. 1990.

R. A. Schlueter et al., "Dynamic Equivalents in Rapid Analysis Of Transient Stability Methods", IEEE Publication, TH0169–3/87/000–0030, pp. 30–36.

METHOD FOR PERFORMING A VOLTAGE STABILITY SECURITY ASSESSMENT FOR A POWER TRANSMISSION SYSTEM

This is a continuation of application Ser. No. 08/236,526 filed on Apr. 29, 1994, now abandoned.

TECHNICAL FIELD

This invention relates generally to planning of electrical power transmission systems, and more particularly, to a method for performing a voltage stability assessment for power transmission systems.

BACKGROUND ART

There are a number of potential voltage instability problems which can arise within an electrical power system. Some of these instability problems occur in distribution systems used for distributing electrical power to utility customers. Many of the sources of these distribution system voltage stability problems have existed for years, and their causes and solutions are well known in the art.

Other problems occur in transmission systems, which are used for transporting bulk power from generation stations to load centers. These stability problems result from such causes as facility outages, clearing of short circuit faults, and increases in load power or inter-area power transfer in a transmission network. Many of these transmission system voltage instability problems have been encountered only in recent years. These instability problems have occurred as a result of recent trends toward: locating generation stations distantly from load centers which limits the effectiveness of their voltage controls, requiring utilities allow power shipment across their transmission system by independent power producers or other utilities, and deterring construction of needed transmission networks, to name a few.

A slow-spreading, uncontrollable decline in voltage, known as voltage collapse, is a specific type of transmission system voltage instability. Voltage collapse results when generators reach their field current limits which causes a disabling of their excitation voltage control systems. Voltage collapse has recently caused major blackouts in a number of different countries around the world.

In order to reduce the possibility of voltage collapse in a power system, and more generally, improve the stability of the power system, system planning is performed by many utility companies. First, a mathematical model representative of the basic elements of the power system, and their interconnection, is constructed. These basic elements include generating stations, transformers, transmission lines, and sources of reactive reserves such as synchronous voltage condensers and capacitor banks. Next, various computational techniques for analyzing system stability are performed using a suitably programmed computer. Based on this analysis, proposed enhancements are formulated in an ad-hoc manner for improving voltage stability security. The mathematical model can be updated based upon these proposed enhancements so that the resulting system stability security can be analyzed. Enhancements which attain predetermined design objectives are then physically implemented in the actual power system. The process of system planning is continual in that it must be regularly performed in light of changing circumstances.

In mathematical terms, voltage collapse occurs when equilibrium equations associated with the mathematical model of the transmission system do not have unique local solutions. This results either when a local solution does not exist or when multiple solutions exist. The point at which the equilibrium equations no longer have a solution or a unique solution is often associated with some physical or control capability limit of the power system.

Current methods for assessing proximity to classic voltage instability are based on some measure of how close a load flow Jacobian is to a singularity condition, since a singular load flow Jacobian implies that there is not a unique solution. These proximity measures include: (i) the smallest eigenvalue approaching zero, (ii) the minimum singular value, (iii) various sensitivity matrices, (iv) the reactive power flow-voltage level (Q-V) curve margin, (v) the real power flow-voltage level (P-V) curve margin, and (vi) eigenvalue approximation measures of load flow Jacobian singularity.

The eigenvalue and minimum singular value methods are disadvantageous in their lacking an indication of the actual locations and causes of voltage instability. Moreover, these methods have been known to produce misleading results with respect to causes of voltage instability as well as the locations and types of enhancements necessary to improve voltage stability security. Furthermore, the computational requirements for the eigenvalue and minimum singular value methods are relatively high. The sensitivity matrix methods have many of the same difficulties as the eigenvalue and singular value methods resulting from being linear incremental measures for a highly-nonlinear discontinuous process.

Regardless of the method employed for assessing proximity to classic voltage instability, existing methods employed by many utility companies assume that there is only one voltage instability problem. Further, it is assumed that one distributed reactive power loading pattern test detects the one voltage instability problem.

It is known that a voltage control area may be defined as an electrically isolated bus group in a power system. Reactive reserves in each voltage control area may be distributed via secondary voltage control so that no generator or station would exhaust reserves before all the other generators in the voltage control area. Although this secondary voltage control is effective in preventing classic voltage instability, previously defined voltage control areas are no longer valid whenever the originally existing transmission grid is enhanced so that bus groups are no longer as isolated. A further disadvantage of this approach is that the reactive reserves for controlling each voltage control area are limited to be within the voltage control area.

Methods are also known which employ a voltage zone defined as a group of one or more tightly-coupled generator P-V buses together with the union of the sets of load buses they mutually support. In such methods, amount of reactive power supply to maintain an acceptable voltage level is controlled. A disadvantage of this approach, however, is that characterizing a voltage stability margin in terms of voltage does not protect against classic voltage collapse.

Current engineering methods of locating potential voltage instability problems includes simulating all single line outage contingencies, and identifying those that do not solve as causing voltage instability. However, the lack of a solution is not a guarantee of voltage instability; a lack of a solution can occur because: the load flow Newton-Raphson-based algorithms are not guaranteed to converge from any particular starting solution, but converge only when the starting point is sufficiently close to the solution; the load flow convergence is not guaranteed even when the system is close to a solution if the solution is close to a bifurcation; round-off error affects the load flow convergence; and discontinuous changes due to switching of shunt elements, or outages of generators or lines can have a dramatic effect on whether the load flow algorithm will converge to a solution. The converged solutions for all single outages only indicates that there are no bifurcations. In order to attempt to prove that the absence of a converged solution is caused by voltage instability, substantial manpower and computer processing time are required. In one such method, the absence of a converged solution is determined to be due to voltage collapse if one can add a fictitious generator with infinite reactive supply at some bus to obtain a converged load flow solution. This method is not foolproof, and furthermore, does not indicate the causes of voltage instability nor indicate where it occurs.

However, current methods are incapable of identifying all of the many different voltage stability problems that can occur in a transmission system. A very routine operating change or supposedly insignificant contingency in a remote region of the system, followed by another contingency, can cause voltage instability. Furthermore, voltage instability may occur in many different sub-regions of the system. Current methods lack diagnostic procedures for identifying causes of specific voltage stability problems, as well as systematic and intelligent enhancement procedures for preventing voltage instability problems.

SUMMARY OF THE INVENTION

For the foregoing reasons, the need exists for a method of identifying potential locations of voltage instability problems, and determining corrective measures to reduce the likelihood of voltage instability.

It is thus an object of the present invention to provide an improved method for determining potential voltage instability problems in an electrical power transmission system.

Another object of the present invention is to provide a method of identifying single contingencies that cause voltage instability in an electrical power transmission system. A further object is to provide a method of identifying multiple contingencies, transfer patterns and levels, and loading patterns and levels that cause voltage instability in an electrical power transmission system.

In carrying out the above objects, the present invention provides a method of performing a contingency analysis for a region of an electric power transmission system having a plurality of buses and a plurality of sources of reactive reserves coupled thereto. The plurality of buses are grouped into a plurality of voltage control areas such that each of the buses within each voltage control area has a similar corresponding reactive power versus voltage relationship. A corresponding reactive reserve basin for each of at least one of the voltage control areas is determined. Each reactive reserve basin comprises at least one of the sources of reactive reserves selected in dependence upon a measure of the reactive reserves depleted at a predetermined operating point of the power system. A single contingency analysis is performed by computing a corresponding quantity for each reactive reserve basin in response to each of a plurality of single contingencies. The corresponding quantity is representative of a reduction in the reactive reserves within the reactive reserve basin. A multiple contingency analysis is performed for each reactive reserve basin based upon the single contingencies whose corresponding quantity exceeds a predetermined threshold.

The present invention further provides a method of performing a voltage stability assessment for a region of an electric power transmission system having a plurality of buses and a plurality of sources of reactive reserves coupled thereto. The plurality of buses are grouped into a plurality of voltage control areas such that each of the bases within each voltage control area has a similar corresponding reactive power versus voltage relationship. At least one of the voltage control areas whose buses therewithin have a voltage at the minimum of the corresponding reactive power versus voltage relationship which exceeds a voltage threshold is selected. A corresponding reactive reserve basin is determined for each of the at least one of the voltage control areas, wherein the reactive reserve basin comprises at least one of the sources of reactive reserves selected in dependence upon a measure of the reactive reserves depleted at a predetermined operating point of the electric power transmission system. A single contingency analysis is performed by computing a corresponding quantity for each reactive reserve basin in response to each of a plurality of single fault contingencies, wherein the corresponding quantity is representative of a reduction in the reactive reserves within the reactive reserve basin, and wherein the plurality of single contingencies includes at least one single generator outage and at least one single line outage. The single contingencies whose corresponding quantity exceeds a predetermined threshold are selected. The voltage stability for single and multiple contingencies with a plurality of transfer and loading patterns are assessed, wherein the single and multiple contingencies are based upon the selected single contingencies.

These and other objects, features and advantages will be readily apparent upon consideration of the following description, appended claims, and accompanying drawings.

BEST MODES FOR CARRYING OUT THE INVENTION

Figure 1:
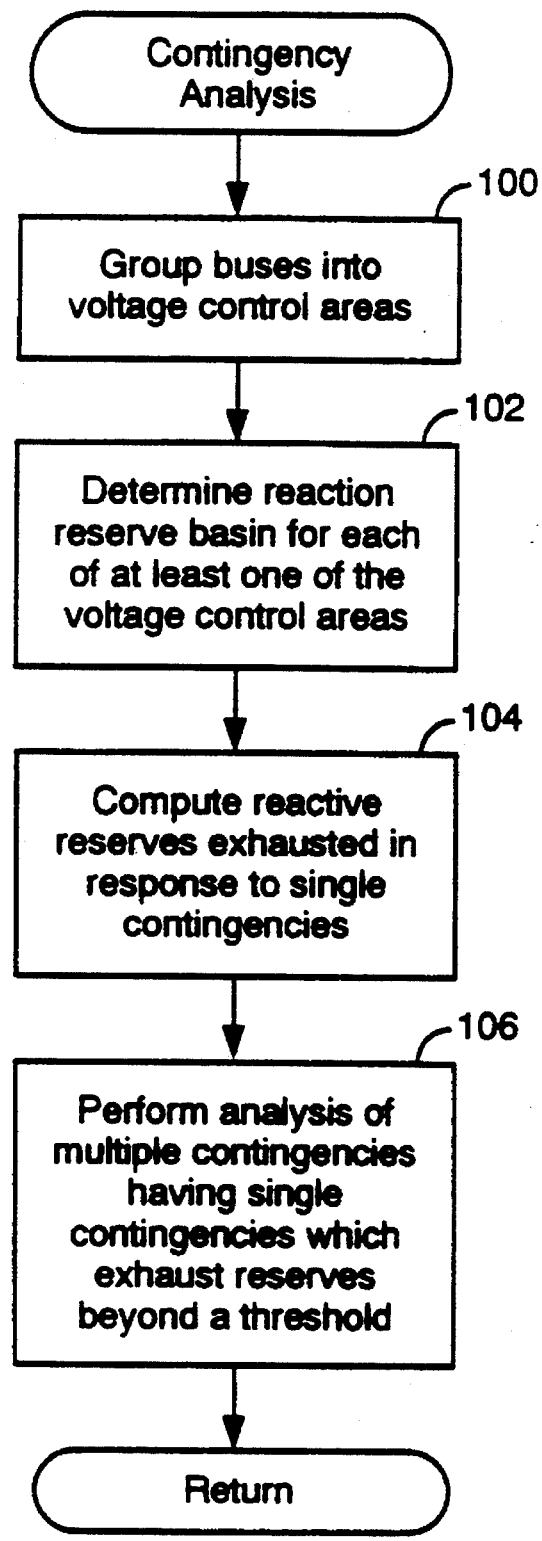
FIG. 1 is a flow chart of performing a contingency analysis according to the method of the present invention.

The method of the present invention overcomes the disadvantages of previous security assessment methods and systems by intelligently selecting single contingencies used in performing a multiple contingency analysis. More specifically, the single contingencies used in performing the multiple contingency analysis are selected based upon the reduction in reactive reserves in a region of the electrical power transmission system known as a reactive reserve basin. Moreover, the method of the present invention produces a hierarchical control structure wherein a lack of controllability provides evidence of a potential voltage instability problem.

In general, the method of the present invention is capable of identifying totally independent voltage stability problems that affect fairly isolated sections of one or more utilities. A unique voltage stability problem occurs when a Q-V curve computed at any bus in a sufficiently coherent group has the same shape, minimum, and reactive reserve basin. The neighboring voltage control areas with reactive supply devices that exhaust nearly all reactive reserves upon reaching the minimum of the Q-V curve computed in some critical voltage control area is a reactive reserve basin for that critical voltage control area. A global voltage stability problem occurs when the reactive reserves in a large number of voltage control areas are exhausted. Global reactive reserve basins for different voltage stability problems do not contain any of the same voltage control areas. Each global voltage stability problem is prevented by a unique and non-overlapping set of reactive supply devices belonging to its reactive reserve basin.

For each global stability problem, a large set of local stability problems lie nested therewithin. In turn, each local stability problem has a different reactive reserve basin associated therewith. However, these local reactive reserve basins overlap. As a result, the possibility exists that a generator, switchable shunt capacitor or SVC belongs to several local reactive reserve basins.

When the reactive reserves in a voltage control area are exhausted, all reactive reserve basins to which that voltage control area belongs experience a significant step change toward voltage instability. The local reactive reserve basin that exhausts all reactive reserves in all voltage control areas due to contingencies or operating changes is the local reactive reserve basin that experiences voltage instability, as long as the contingencies or operating changes directly impact the critical voltage control area where the Q-V curve is computed to determine that reactive reserve basin. The exhaustion of all reactive reserves for all voltage control areas in a local reactive reserve basin produces voltage instability for that critical voltage control area because that critical voltage control area cannot obtain all the reactive supply needed to cope with the contingencies or operating changes. As used herein, a contingency may be any unexpected discrete change in the transmission system due to equipment loss (such as a generator, transmission line, or transformer) or a short circuit (typically referred to as a fault contingency).

A locally most vulnerable critical voltage control area and reactive reserve basin is one that belongs to almost every local reactive reserve basin also belonging to a global reactive reserve basin. This locally most vulnerable reactive reserve basin has relatively small reserves that exhaust rapidly for Q-V curve stress tests computed for almost every local critical voltage control area which has local reactive reserve basins that are subsets of a global reactive reserve basin. Such locally most vulnerable reactive reserve basins should be the focus of any system enhancements.

It should be noted that local voltage stability problems are those brought on by contingencies or operating changes and not the global voltage stability problems which would most often only develop out of a spreading local voltage stability problem. Generally, all such local voltage stability problems need be addressed, not just the locally most vulnerable. This is so because each local stability problem, including the locally most vulnerable, may be brought on by different contingencies or operating changes that cause reduction of, or partially cut off, the reactive reserves associated with the critical voltage control area.

More specifically, the method of the present invention employs Q-V curve tests for determining a hierarchical control structure which indicates that voltage instability occurs when a lack of controllability is evident. Performing a multiple contingency analysis is illustrated by the flow chart shown in FIG. 1. The multiple contingency analysis is to be performed for a region of a power system having a plurality of buses and a plurality of sources of reactive reserves coupled thereto.

In block 100, the plurality of buses are grouped into voltage control areas in dependence upon a corresponding reactive power versus voltage relationship for each of the buses. More specifically, each voltage control area is defined as a coherent bus group where adding a reactive load at any bus in the group produces nearly identical Q-V curves in both shape and magnitude. As a result, each voltage control area has a unique voltage instability caused by a local incremental reactive supply problem.

In block 102, determining a corresponding reactive reserve basin for each of at least one of the voltage control areas is performed. Each reactive reserve basin comprises at least one source of reactive reserves selected in dependence upon a quantity representative of the reactive reserves exhausted at a predetermined operating point of the power system. The at least one source of reactive reserves contained within the reactive reserve basin form a set of stabilizing controls for the corresponding voltage control area. Preferably, the predetermined operating point of the power system is the minimum of the Q-V curve. It is also preferred that the total reserves in a voltage control area be depleted by a certain percentage and/or below a certain level before the reactive sources in the voltage control area added to a reactive reserve basin.

A single contingency analysis is performed by block 104. More specifically, a quantity representative of the reactive reserves depleted in response to each of a plurality of single contingencies is computed. These single contingencies include single line outages and single generator outages. Using the information computed in the single contingency analysis, a multiple contingency analysis is performed in block 106. The multiple contingencies selected for analysis comprise at least two of the single contingencies whose corresponding reactive reserve depletion quantity exceeds a predetermined threshold. The multiple contingency analysis is performed for at least one reactive reserve basin.

Figure 2:
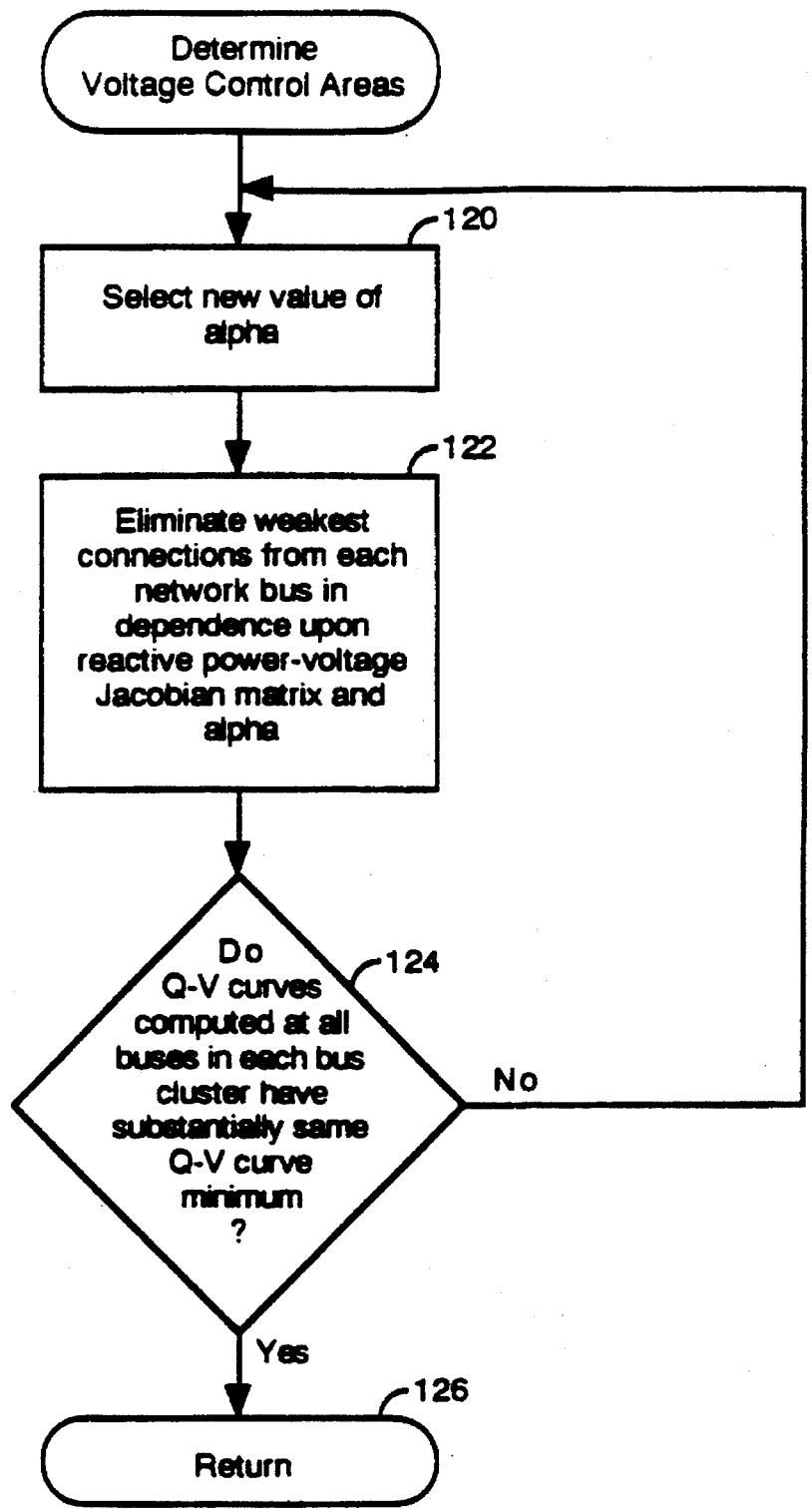
FIG. 2 is a flow chart of grouping buses into voltage control areas according to the method of the present invention.

In FIG. 2, a flow chart illustrates grouping the buses into voltage control areas in accordance with the present invention. Voltage control areas are defined as coherent bus groups where the Q-V curve computed at any bus in that coherent group has virtually identical voltage and reactive margin at the Q-V curve minimum. Furthermore, the shape and slope of the Q-V curve computed at any bus in the voltage control area should be nearly identical. Based on the above definition, the voltage control areas are determined using a coherent group clustering algorithm. An initial value of a control parameter, alpha, for the clustering algorithm is selected in block 120. The coherent group clustering algorithm employed is based on eliminating the weakest connections from each network bus until the sum of reactive power-voltage Jacobian elements for eliminated branches is less than a parameter alpha times the largest diagonal element of the reactive power-voltage Jacobian matrix. The isolated bus groups identified for a particular alpha are the coherent bus groups for that alpha value. This step of isolating bus groups in dependence upon the alpha parameter is illustrated by block 122.

For smaller values of alpha selected in block 120, the bus groups are continuously split until each bus group comprises a single bus. On the contrary, if alpha is selected to be relatively large in block 120, all buses belong to one bus group. In block 124, a level of coherency within bus groups as well as a concomitant incoherency between bus groups is examined based upon the Q-V curves. In particular, the Q-V curves are examined to determine whether all buses in each bus cluster have substantially the same Q-V curve minimum. If the Q-V curve minima are not substantially the same, then flow of the routine is directed back up to block 120 where a new value of alpha is selected. If the Q-V curve minima are substantially the same, then the routine is exited by return block 126.

Figure 3:
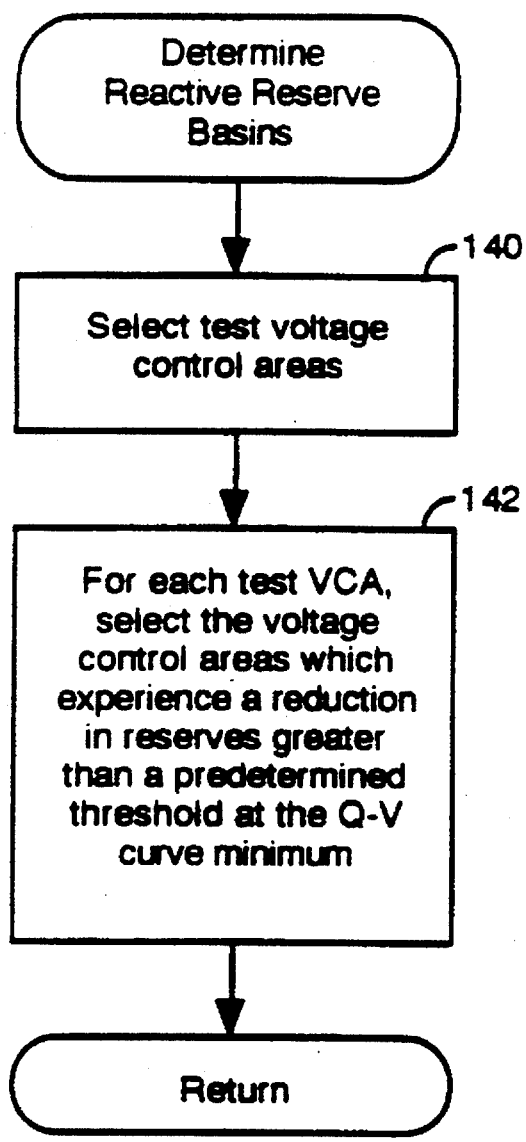
FIG. 3 is a flow chart of determining a reactive reserve basin according to the method of the present invention.

Determining the reactive reserve basin for each of at least one of the voltage control areas is illustrated by the flow chart in FIG. 3. In block 140, a set of test voltage control areas is selected. The selected test voltage control areas are those that have large shunt capacitive supply, or an increase in reactive loss or reactive supply as Q-V curves are computed in neighboring test voltage control areas. Line charging, shunt capacitive withdrawal, series $I^2X$ series reactive loss, increased reactive inductive or capacitive shunts due to under load tap changers, or switchable shunt capacitors or reactors cause the increase in reactive loss or supply in a voltage control area. A Q-V curve is computed in each test voltage control area that has satisfied these conditions as Q-V curves were computed in other voltage control areas. Reactive reserve basins are only determined for those test voltage control areas, called critical voltage control areas, with Q-V curves having a large voltage and a small reactive margin at the minimum of the Q-V curve. In practice, the minimum of the Q-V curve can be obtained using a standard Newton-Raphson algorithm.

For each critical voltage control area, the voltage control areas which experience a reduction in reserves greater than a predetermined threshold at the Q-V curve minimum is selected in block 142. In practice, the predetermined threshold is measured on a relative scale and is selected to be less than 100%. In one embodiment, the reactive reserve basin includes voltage control areas which experience greater than 75% reduction in reserves in computing the Q-V curve down to the Q-V curve minimum. This logic is aimed at guaranteeing that every reactive reserve basin is robust in the sense that no contingency or operating change that causes voltage instability on the test voltage control area can exhaust all of the reactive supply and voltage control reserve in a voltage control area outside those voltage control areas contained in the reactive reserve basin computed.

In the flow chart of FIG. 3, the reactive reserve basins are computed only for the selected subset of voltage control areas that are predicted to be vulnerable to voltage instability by having large capacitive supply, experiencing large shunt capacitive supply increases, or experiencing inductive increases as Q-V curves are computed in other test voltage control areas having Q-V curve voltage minima greater than a threshold and reactive minima smaller than another threshold. Moreover, the use of reactive reserve quantities provides an accumulative proximity measure that makes voltage stability assessment practical because it is an exhaustible resource that always correlates well with proximity to voltage instability and is easily computed for a contingency.

In such a manner, unique global voltage stability problems can be identified that have large numbers of voltage control areas and are nearly disjoint. Most, if not all, voltage stability problems that ever occur are local. Moreover, a multiplicity of local voltage stability problems are associated with each global voltage stability problem. Indeed, local voltage stability problems may be determined with a local reactive reserve basin that is substantially a subset of some global reactive reserve basin. Identifying critical voltage control areas for each local stability problem and their reactive reserve basins identifies the location of each stability problem, what reactive reserves prevent each local stability problem from occurring, and why each local voltage instability occurs.

Still further, the locally most vulnerable reactive reserve basin may be determined that lies within virtually every other local reactive reserve basin according to the Q-V curve with nearly the largest voltage maxima and nearly the smallest reactive minima. Thereafter, its reserves are rapidly exhausted for the Q-V curve computed in the critical voltage control areas associated with the global and all nested local reactive reserve basins. However, despite the fact that the Q-V curve may have the largest voltage minima and the largest reactive margin, it may not be the most probable local voltage stability problem because there may not be severe contingencies that directly impact its critical voltage control area because it lies in a remote and low voltage part of the system. This leads to contingency selection for each local reactive reserve basin where in some utilities the same contingencies affect the global and all locals, and yet in other utilities different contingencies affect different locals within a global reactive reserve basin.

Figure 4:
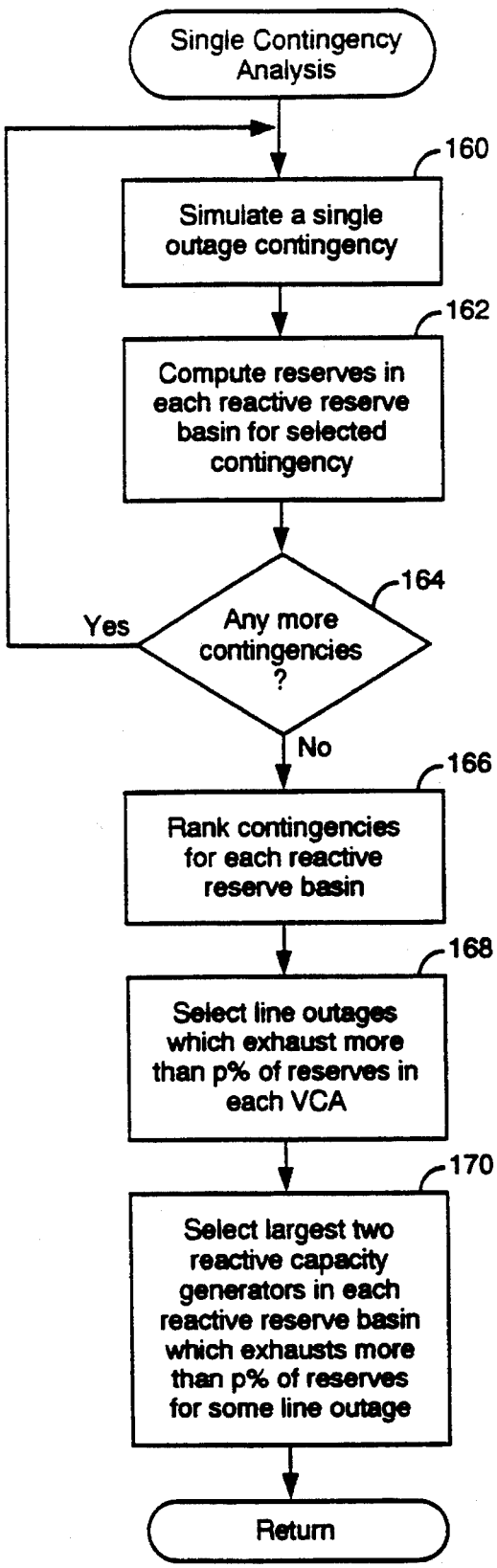
FIG. 4 is a flow chart of performing a single contingency analysis according to the method of the present invention.

Performing a single contingency analysis is illustrated by the flow chart in FIG. 4. This single contingency analysis is performed for each critical voltage control area and its associated reactive reserve basin. In block 160, a single contingency is simulated. Specific types of single contingencies include single generator outages and single line outages. The reactive reserves in each reactive reserve basin are computed for the single contingency in block 162. Conditional block 164 examines whether there are more single contingencies to be simulated. If so, flow of the routine is directed back up to block 160 where another single contingency is simulated. If no further contingencies are to be simulated, then the contingencies in each reactive reserve basin are ranked from smallest to largest based upon the reactive reserves exhausted by block 166. In block 168, the single line outages which exhaust more than a predetermined percentage of the reserves in each voltage control area are listed.

In block 170, the two largest reactive capacity generators in each reactive reserve basin which exhaust more than a predetermined percentage of its reserve for some contingency are selected. These generators are placed on a generators list. The two lists formed in blocks 168 and 170 are used in forming multiple contingencies in a subsequent multiple contingency analysis.

Figure 5:
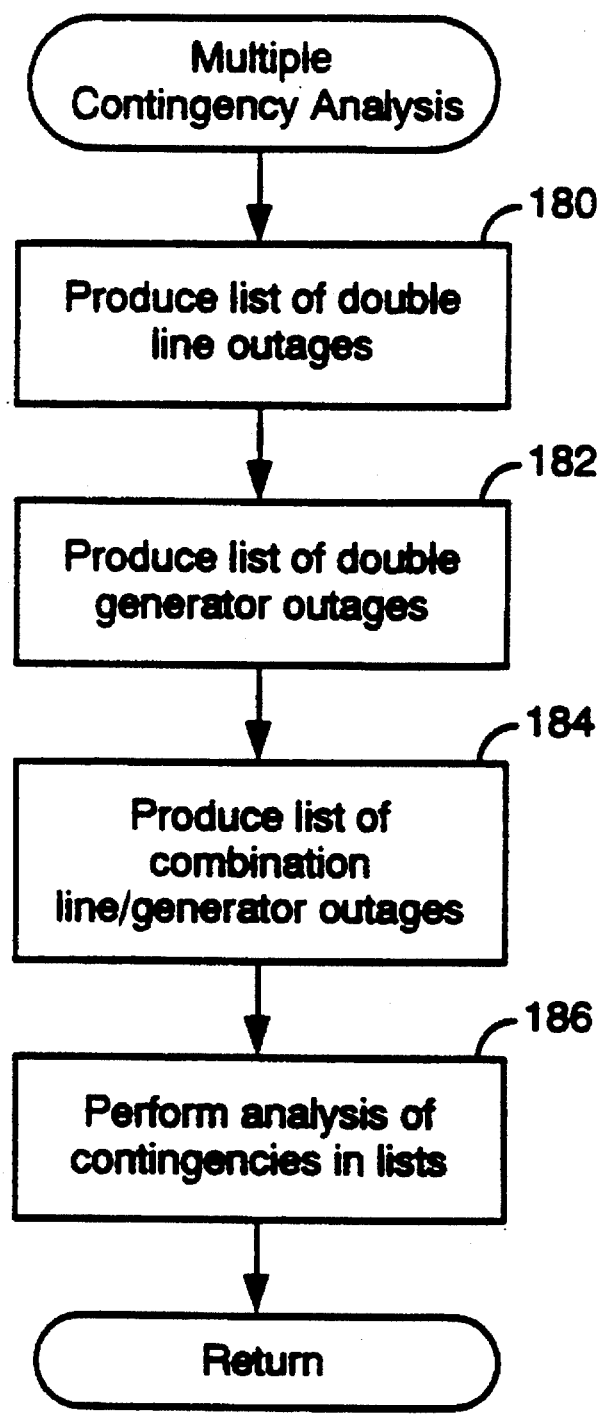
FIG. 5 is a flow chart of performing a multiple contingency analysis according to the method of the present invention.

Performing multiple contingency analysis is illustrated by the flow chart in FIG. 5. Using the list of single contingencies formed in block 168, a list of double line outages is formed in block 180. Similarly, using the list of generators formed in block 170, a list of double generator outages is formed in block 182. In block 184, a combination of line and generator outages from the lists formed in blocks 168 and 170 are used to form a combination list. The step of performing an analysis of contingencies based upon the lists produced in blocks 180, 182, and 184, is illustrated by block 186.

Figure 6:
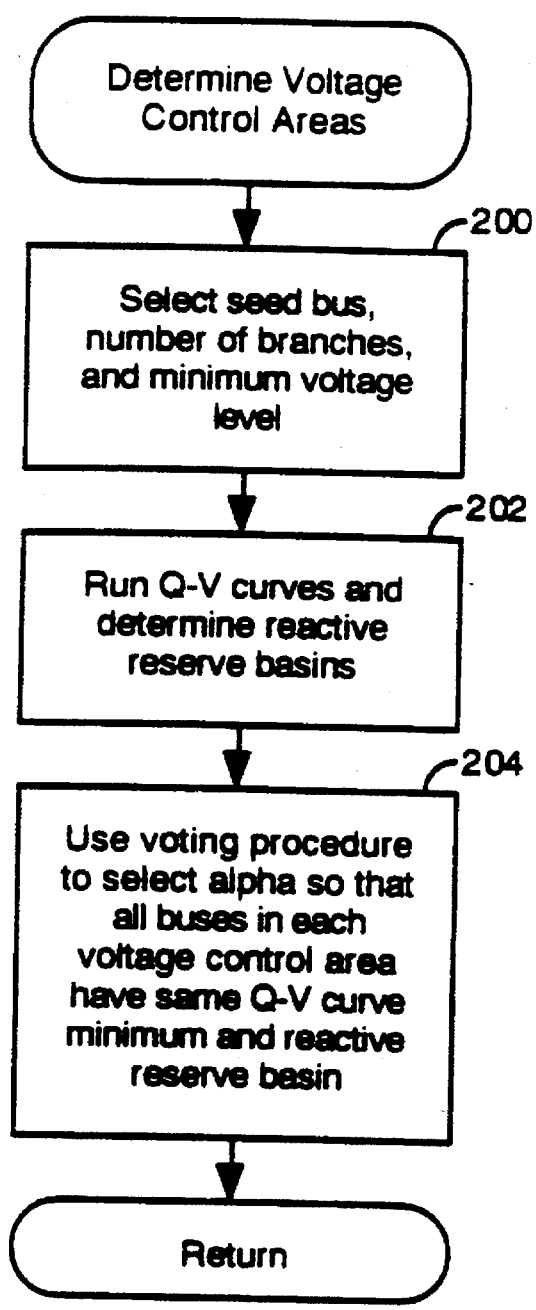
FIG. 6 is a flow chart of determining voltage control areas according to the method of the present invention.

Software for determining the voltage control areas is illustrated by the flow chart in FIG. 6. In block 200, an initialization step is performed wherein a seed bus, a number of branches, and a minimum voltage level are selected in order to define a region of interest. Next, the Q-V curves are run and reactive reserve basins are determined at all buses in the region of interest in block 202. In block 204, a voting procedure is employed to select alpha where the Q-V curves computed at all buses in each bus cluster has substantially the same Q-V curve minimum and reactive reserve basin. The parameter alpha decides the size of the coherent bus clusters which form voltage control areas. As alpha decreases, the size of the coherent bus clusters increases through aggregation of coherent bus clusters identified for larger alpha values. This search procedure eliminates the need for a user to make a judgment on where the differences in voltage changes at buses within coherent bus groups increases from very small values, and the voltage change differences between buses in different bus groups for a disturbance suddenly increase to large values as alpha decreases.

In the search procedure for alpha, a bounded interval of potential values of alpha is first selected. The procedure places a disturbance, namely a voltage change at some seed bus, and calculates the changes in voltage and angle at each bus due to the disturbance. The procedure finds bus clusters for ten equally-spaced alpha values in this bounded interval, and then finds the smallest alpha value where the voltage and angle changes within the bus group satisfy the following equations:

$$\Delta V_j - \Delta V_i \leq k_1 \Delta V_i$$

$$\Delta \theta_j - \Delta \theta_i \leq k_2 \Delta \theta_i$$

where $\Delta V$ is a voltage change, $\Delta \theta$ is an angle change, i and j are indices representing two buses within a bus group, and $k_1$ and $k_2$ are fixed parameters.

The results are confirmed as voltage control areas by running Q-V curves at all buses in the voltage control areas to establish if alpha was selected properly such that the minima of the Q-V curves and the reactive reserve basin obtained from the minima of the Q-V curves are identical. If the alpha value was chosen correctly so that the Q-V curve minima and reactive reserve basins computed at every bus in the bus clusters selected are identical, the user has obtained the voltage control areas and proper alpha value for obtaining these voltage control areas. If the alpha value was not correctly selected because the Q-V curve minima and reactive reserve basins are not identical for buses in a voltage control area, several larger values of alpha that produce smaller bus cluster groups can be examined until bus clusters which have nearly identical Q-V curve minima and reactive reserve basins are found. Hence, computing voltage control areas in this manner is based on both the level of coherency within bus clusters and the level of incoherency across bus clusters.

Alternative embodiments can be formed which explicitly use the definition of voltage control area in order to find alpha. More specifically, an alternative embodiment would search for the value of alpha that is as small as possible, i.e. which produces the largest bus cluster, and yet assures that the Q-V curves computed at every bus in each bus cluster has nearly identical Q-V curve minima and reactive reserve basins. The search for alpha would only concentrate on bus clusters in some region of interest, which are buses above a certain voltage rating and at most three circuit branches from some seed bus.

Figure 7:
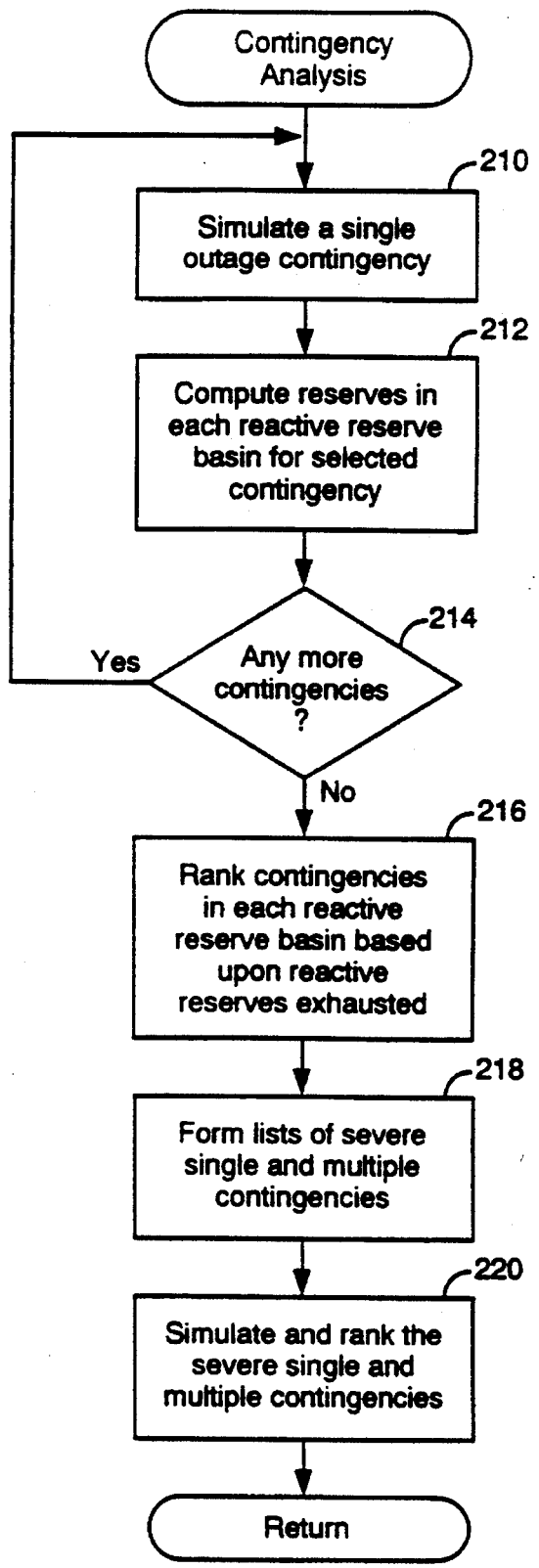
FIG. 7 is a flow chart of performing a contingency selection according to the method of the present invention.

Turning now to FIG. 7, a flow chart of a contingency selection program is illustrated. As seen therein, a contingency selection and ranking for contingencies and operating changes that bring a particular test voltage control area and its reactive reserve basin closest to voltage instability is performed. The contingency selection and rankings are performed for each critical voltage control area and associated reactive reserve basin.

In block 210, a single line outage contingency is simulated. The reserves in each reactive reserve basin are computed for that contingency in block 212. In conditional block 214, it is determined whether or not there are any other contingencies to be simulated. If there are further contingencies to be simulated, then flow of the method is returned back to block 210. If there are no additional contingencies to be simulated, then flow of the routine advances to block 216.

In block 216, the contingencies are ranked in each reactive reserve basin based upon reactive reserves. In block 218, the line outages that exhaust more than P% of the reserves in each voltage control area are selected and placed in a list. Further, the largest two reactive capacity generators in each reactive reserve basin that exhausts P% of its reserve for some line outage are also selected. These generators are placed in another list. The list of generators is used to produce a set of severe single and double generator outage contingencies. The list of line outages are used to produce a set of severe single and double line outage contingencies. The list of generators and line outages is used to produce a set of combination line outage and loss of generation contingencies.

In block 220, the severe single and multiple contingencies are simulated and ranked based upon the reactive reserve in a reactive reserve basin. The contingency selection routine can be run several times in sequence to obtain all of the information on why particular reactive reserve basins are vulnerable to voltage instability. The initial run would entail taking all single line outages in one or more areas, or in one or more zones or areas where voltage instability is to be studied, or in the entire system model.

In a preferred embodiment, the contingency selection routine would output a report summarizing the effects of the worst five contingencies for each critical reactive reserve basin. The output for each reactive reserve basin has an initial summary of the status in the pre-contingency case, including the bus names and numbers for all buses in each of the reactive reserve basin voltage control areas, the reactive supply capacity and reserves for generators, synchronous condensers, and switchable shunt capacitors at the bus where the component is located.

After the initial status of a reactive reserve basin is provided, the five worst contingencies for that reactive reserve basin are given. Each contingency is described and the reactive supply reserves at all generators and switchable shunt capacitors in each reactive reserve basin voltage control area are given. The order of voltage control areas in the report of voltage control area reactive supply reserves for a particular reactive reserve basin is based on the sequence of reserve exhaustion during computation of the Q-V curve. The order of voltage control areas aid in indicating the order of exhaustion as voltage collapse is approached for any contingency for that reactive reserve basin. The order of the contingencies presented in the output report for a reactive reserve basin is based on the percentage of pre-contingency reactive reserves exhausted with the contingency causing the largest percentage reduction reported first. The order of the reactive reserve basins presented in the output report is sorted so that the reactive reserve basins that experience the largest percentage exhaustion of reactive supply on generators and switchable shunt capacitors for that reactive reserve basin's worst contingency are reported first.

The contingency selection routine assists the user in determining the reactive reserve basins that experience voltage instability because they would be the first to be reported. If no reactive reserve basin experience voltage instability, the reporting of the reactive reserve basins in the order of the largest percentage reduction in total reserves gives only a partial indication of the reactive reserve basin with the most severe contingencies. Percentage reduction in total reactive reserves of a reactive reserve basin is an excellent indicator of the worst contingency in a reactive reserve basin and the most vulnerable reactive reserve basin when the system is experiencing or is nearly experiencing voltage instability. The number of voltage control areas in a reactive reserve basin that exhausts reserves and the status of whether or not reactive reserves are exhausted on voltage control areas listed at the end of the list given for that reactive reserve basin are effective indicators in judging proximity to voltage instability when the contingency does not bring a reactive reserve basin close to voltage instability. The reason for utilizing both indicators for voltage collapse proximity rather than percentage reactive reserve reduction is that the system experiences a quantum step toward voltage instability after each successive voltage control area experiences reserve exhaustion, and experience indicates voltage control areas that exhaust reserves near the Q-V curve minimum for the pre-contingency case are near the Q-V curve minimum for most contingencies.

An alternative embodiment of the contingency selection routine would further include modifying the set of reactive reserve basin voltage control areas reserve level for contingencies that lie in the path between a reactive reserve basin voltage control area and the test voltage control area. Such contingencies can have a reactive reserve basin that does not contain the pre-contingency reserve basin voltage control area that is totally or partially disconnected from the test voltage control area by the line outage contingency. Contingencies that have a modified reactive reserve basin and the voltage control area that should be deleted from the pre-contingency reactive reserve basin both can be detected by looking for contingencies where a reactive reserve basin voltage control area experiences little reduction in reserve compared to other severe contingencies. The deletion of these voltage control areas from reactive reserve basins for those contingencies will make the contingency ranking based on reactive reserve basin reactive reserves more accurate without requiring the user to make judgments.

Figure 8:
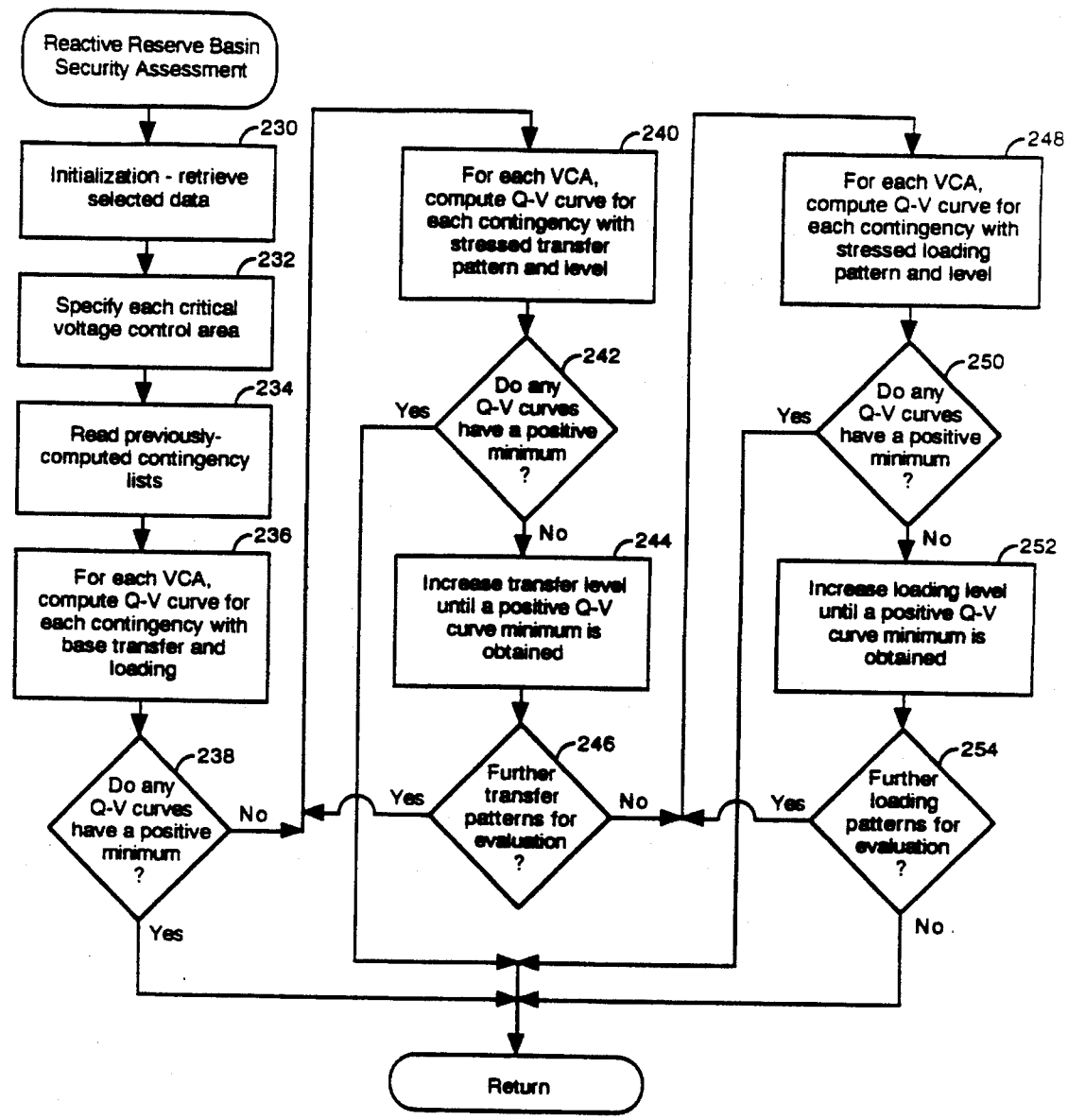
FIG. 8 is a flow chart performing a reactive reserve basin security assessment according to the method of the present invention.

In FIG. 8, performing a reactive reserve basin security assessment is illustrated by a flow chart. An initialization step is performed in block 230 wherein selected data is retrieved. This data includes base case simulation data, values of alpha, values of a lower voltage limit where attempts to compute a Q-V curve minimum are aborted, and the criterion used for selecting the reactive reserve basin voltage control areas.

In block 232, each critical voltage control area is specified along with its test bus. The lists of single line outage, double line outage, single loss of generation, double loss of generation, and combination contingencies are read in block 234.

In block 236, the Q-V curves are computed for each contingency specified for the base case for each voltage control area. In conditional block 238, a check for a positive Q-V curve minimum is performed. If a Q-V curve has a positive minimum, then execution of the routine is stopped. If there are no positive Q-V curve minima, then execution of the routine proceeds to block 240.

In block 240, a transfer pattern and level are read and a Q-V curve is computed for each contingency and voltage control area. Conditional block 242 checks whether or not there is a Q-V curve with a positive minimum. If a Q-V curve with a positive minimum exists, then execution of the routine is stopped. Otherwise, the transfer level is increased until a positive Q-V curve minimum is obtained in block 244. If, at block 246, there are additional transfer patterns which need evaluation, then flow of the routine is directed back up to block 240. If no additional transfer patterns need evaluation, then a load pattern and level is read in block 248, and a Q-V curve is computed for each contingency and voltage control area. If there is a Q-V curve with a positive minimum as detected by conditional block 250, then execution of the routine is stopped. Otherwise, the load level is increased until a positive Q-V curve minimum is obtained in block 252. If, at block 254, additional transfer patterns need evaluation, then flow of the routine is directed back up to block 248. If no additional transfer patterns need evaluation, then execution of the routine is completed.

Figure 9:
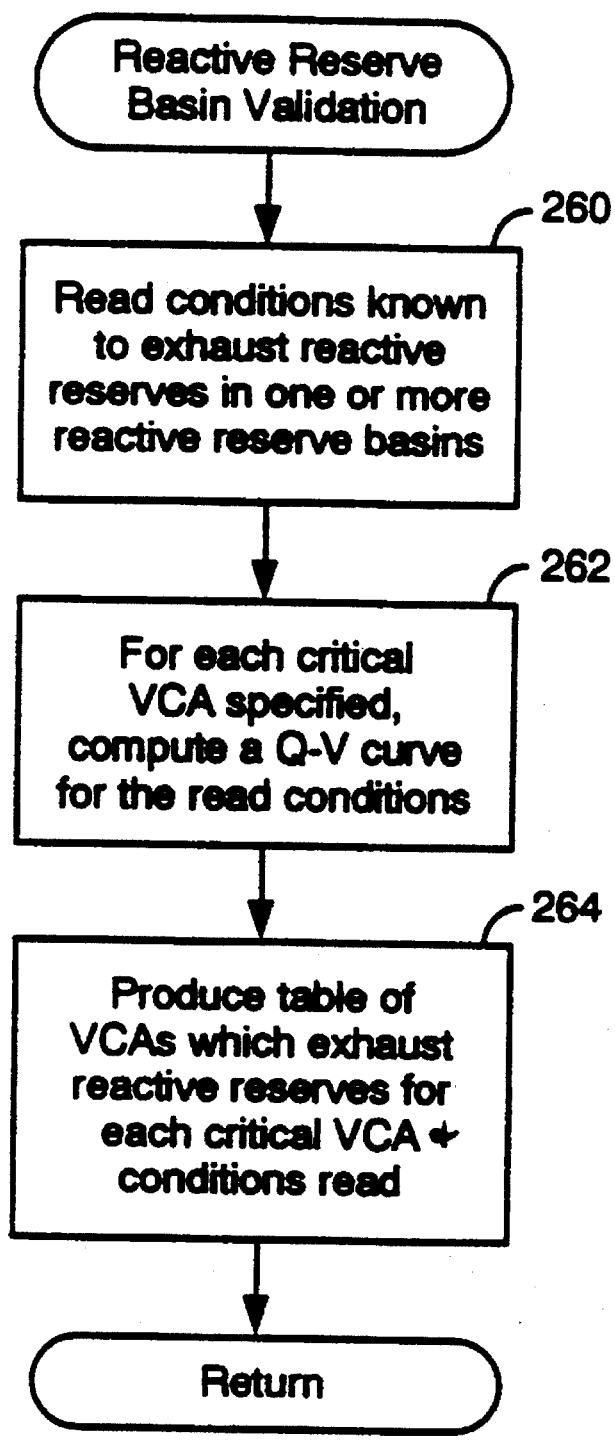
FIG. 9 is a flow chart demonstrating robustness of the reactive reserve basins according to the method of the present invention.

Ideally, the computed reactive reserve basins are robust. Robustness implies that the voltage control areas that experience near exhaustion of reserves for all reactive supply and voltage control devices at the Q-V curve collapse point in the pre-contingency case can experience exhaustion of reserves at the Q-V curve collapse point after: any single contingency, transfer, or loading pattern change; or after any combination line outage and loss of reactive resource contingency; or after any combination line outage/loss of reactive resource contingency and any transfer or loading change in any pattern. Demonstrating that the reactive reserve basins are robust based on the above definition is illustrated by the flow chart in FIG. 9.

In block 260, a set of line outage contingencies, loss of resource contingencies, transfers, real power loading pattern changes, operating changes, and combination line outage/ loss of resource contingencies that are known to exhaust reactive reserves in one or more specified reactive reserve basins as well as test buses in critical voltage control areas for computing the Q-V curves that produce each of these reactive reserve basins are provided as input to the routine. These inputs can be provided from the output of the contingency selection routine.

In block 262, the voltage control areas belonging to a specified reactive reserve basin are determined by computing the Q-V curve and its minimum for each single or double contingency or operating change specified. The reactive reserve basins of the Q-V curve computed at a test bus in a critical voltage control area for each single or double contingency or operating change are outputted into a table for that critical voltage control area by block 264. This table is used to confirm that contingencies or operating changes do not exhaust reserves on voltage control areas where all reactive supply and voltage control reserves are not nearly or completely exhausted when a Q-V curve is computed for the pre-contingency case at a test bus in a critical voltage control area.

Figure 10:
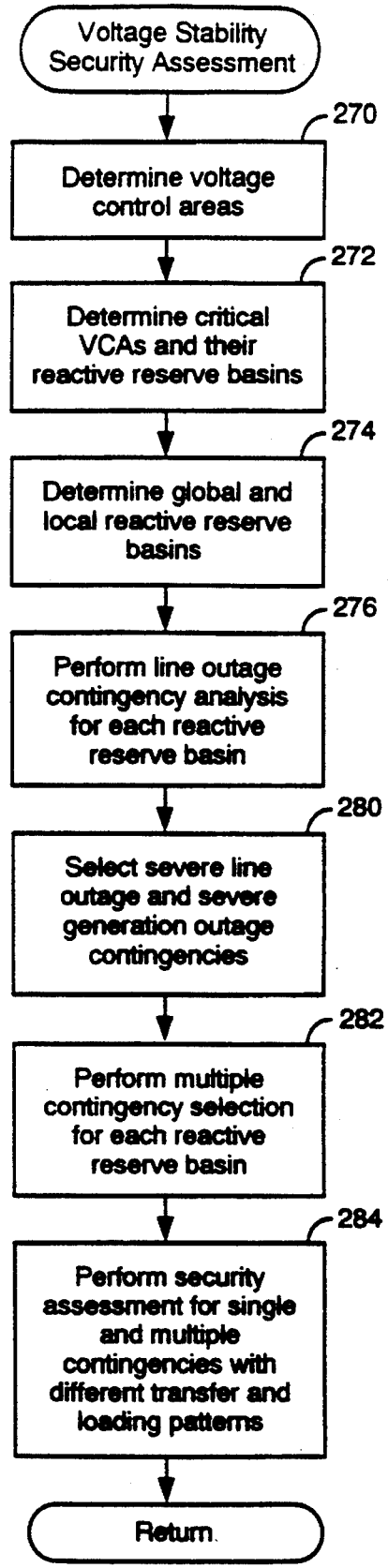
FIG. 10 is a flow chart performing a stability security assessment according to the method of the present invention.

Performing an intelligent voltage stability security assessment is illustrated by the flow chart in FIG. 10. The procedure involves determining, at block 270, the voltage control areas, i.e. the bus clusters where the Q-V curves computed at any bus have the same shape and the same curve minimum, and the same reactive reserve basin. These bus clusters are found based on coherency, in other words, the same voltage and angle changes are exhibited at all buses in the voltage control area due to any disturbance. Alternatively, the bus clusters are found based on controllability, observability, or modal properties.

Next, the subset of all of the reactive supply resources within voltage control areas that exhaust all of their reactive supply at the minimum of the Q-V curve computed at any bus in the test voltage control area is determined at block 272. The minimum of the Q-V curve can generally be obtained using a normal Newton-Raphson algorithm using a standard procedure that will obtain the minimum when the direct application of the Newton-Raphson algorithm would stop obtaining solutions short of the minimum.

A second condition for buses to belong to a voltage control area is that the Q-V curve computed at each bus in a test voltage control area exhausts the same reactive supply resources in the same set of voltage control areas at the Q-V curve minimum. The subset of reactive supply resources in a system exhausted at the Q-V curve minimum is called the reactive reserve basin for that voltage control area. The slope of the Q-V curve decreases discontinuously each time all of the reactive supply reserves in one of the voltage control areas in the reactive reserve basin is exhausted. The reactive supply from a reactive reserve basin voltage control area to the test voltage control area is maintained as long as one of the voltage controls associated with reactive supply devices in a voltage control area is active and holds the voltage in that voltage control area.

The discontinuity in the slope of the Q-V curve occurs not only due to loss of reactive supply from the reactive reserve basin voltage control area, but occurs due to the increased rate of increase in reactive losses with voltage decline that accompanies loss of all voltage control in a voltage control area. The reactive reserve basins are computed for only selected subsets of voltage control areas that are predicted to be vulnerable to voltage instability. The voltage control areas that can experience voltage collapse are predicted by determining those that have large shunt capacitive supply or experience large reactive network loss change for Q-V curves computed to determine the reactive reserve basin for a neighboring voltage control area.

A further step entails determining, at block 274, those reactive reserve basins and their associated test voltage control areas that are most vulnerable to single or multiple contingencies. The five worst contingencies, which either cause voltage collapse by exhausting all reactive reserves in the reactive reserve basin or bring the reactive reserve basin closest to voltage instability by exhausting the largest percentages of the reactive reserves in that reactive reserve basin, are also found at block 276.

A file of single worst line outage contingencies that exhaust P% or more of the reactive reserves in any reactive reserve basin is produced at block 280. Further, a list of worst generator outage contingencies which is also produced, at block 280, by identifying the two largest capacity generators from each reactive reserve basin where one or more line outage contingencies exhaust P% or more of the reactive reserve basin reserves. These two contingency lists are used to produce, at block 282, a list of all single line outages, all single generator outages, all double line outages, all double generator outages, and combination line and generator outages. Also, a list of test voltage control areas where P% or more of the reactive reserves were exhausted by single line outages is produced.

These files are used to compute Q-V curve minima and reactive reserve basin voltage control areas with reactive reserves for every contingency in the lists for each reactive reserve basin test voltage control area specified. Although the number of contingencies in the lists is preferably limited to the projected ten worst contingencies, a user may be allowed to run all of the other contingencies.

In block 284, a security assessment for single and multiple contingencies with different transfer and loading patterns is performed. Transfer limits are determined for each anticipated transfer pattern (specified by a group of generators with increasing generation in some percentage of the total transfer level and a group of generators with decreasing generation in some percentage of the total transfer level). The transfer level is increased in increments and Q-V curves are computed for all reactive reserve basin critical voltage control areas and all single and multiple contingencies. If all Q-V curves for all single and multiple contingencies in every critical voltage control area have negative Q-V reactive minima (implying voltage stability) the total transfer level is incremented again and all Q-V curves are recomputed. This process is repeated until one Q-V curve has Q-V curve positive minima (implying voltage instability). The total transfer level limit for the transfer pattern is thus determined. A transfer pattern level limit is computed for each anticipated transfer pattern and the reactive reserve basin where the Q-V curve is positive for one or more single or multiple contingencies is noted.

The same process is repeated for loading patterns to find those reactive reserve basins that have positive Q-V curve minima for one or more contingencies. The reactive reserve basins that constrain each transfer (or loading pattern) and the contingencies that cause the voltage instability for that transfer (or loading pattern) are used as the basis of designing enhancements that prevent voltage instability in that reactive reserve basin for those contingencies and a desired level of transfer (possibly larger than the current transfer limit). It should be noted that the general planning design criterion for voltage instability only requires that a power system survive a worst combination generator and line outage and does not require that a system survive a double line outage contingency.

If the load flow will not solve for some contingency, transfer pattern and level, or loading pattern and level, reactive reserves are increased in all generators in each global reactive reserve basin, one at a time. If the addition of reactive reserves in some global reactive reserve basin allows a Q-V curve load flow solution to be computed, then the contingency, transfer pattern and level, and loading pattern and level would cause a voltage instability in that global reactive reserve basin. This feature allows on to determine whether a contingency, or transfer or loading pattern causes a voltage instability in some other global reactive reserve basin than the one being studied.

If one has performed the above assessment of transfer limits for each anticipated transfer pattern and loading limits for each anticipated loading pattern, one can determine the transfer pattern limits that need to be increased and the desired level, as well as the loading pattern limits that need to be increased and their desired levels. For each transfer (or loading) pattern where the design criterion is not satisfied out to the desired limit, one knows the local reactive reserve basin or basins and the contingencies that cause voltage instability in that reactive reserve basin or basins.

The previously described embodiments of the present invention have many advantages. By determining single contingencies which exhaust more that pre-specified percentage of reactive reserves, a computationally efficient method of performing multiple contingency analysis results. The resulting method is capable of selecting multiple loss of reactive resources, line outages, and combinations thereof, for performing an analysis of the effect of multiple contingencies on each reactive reserve basin. Furthermore, embodiments of the present invention are capable of identifying the specific critical voltage control area and reactive reserve basin that is brought to voltage instability after some contingency by a particular transfer or loading pattern change that can cause voltage instability in a voltage control area.

Another advantage is that the present invention identifies a global stability problem and each local voltage stability problem. The loss of stability for each such problem is caused by a lack of sufficient reactive supply to its critical voltage control area. The reactive reserve basin in the critical voltage control areas that maintain voltage and thereby prevent the reactive losses that consume and choke off reactive supply from outside, as well as inside, the respective reactive reserve basin from reaching the critical voltage control area. A global voltage stability problem generally has many individual local voltage stability problems and each can occur due to different contingencies or in some cases due to the same severe contingencies that cause loss of local voltage stability for several critical voltage control areas by exhausting their reactive reserve basin reserves. The advantages still further include detecting each critical voltage control area, its reactive reserve basin, the severe single and multiple contingencies that cause voltage instability in several local reactive reserve basins and may even cause a global voltage instability.

While the best modes for carrying out the invention have been described in detail, those familiar with the art to which this invention relates will recognize various alternative designs and embodiments for practicing the invention as defined by the following claims.

What is claimed is:

1. A method of performing a contingency analysis for a region of an electric power transmission system having a plurality of buses and a plurality of sources of reactive reserves coupled thereto, the method comprising:

grouping the plurality of buses into a plurality of voltage control areas such that each of the plurality of buses within each voltage control area has a similar corresponding reactive power versus voltage relationship;

determining a reactive reserve basin for at least one of the plurality of voltage control areas, the reactive reserve basin comprising at least one of the sources of reactive reserves selected in dependence upon a measure of the depletion of reactive reserves at a predetermined operating point of the electric power transmission system;

performing a single contingency analysis by computing a corresponding quantity for each reactive reserve basin in response to each of a plurality of single contingencies, wherein the corresponding quantity is representative of a reduction in reactive reserves within the reactive reserve basin; and performing a multiple contingency analysis, for each reactive reserve basin, based upon the single contingencies whose corresponding quantity exceeds a predetermined threshold.

2. The method of claim 1 wherein grouping a plurality of buses comprises:

determining whether each of the plurality of buses within each of the plurality of voltage control area has a substantially similar reactive margin at the minimum of the corresponding reactive power versus voltage relationship;

determining whether each of the plurality of buses within each of the plurality of voltage control area has a substantially similar voltage at the minimum of the corresponding reactive power versus voltage relationship; and determining whether each of the plurality of buses within each of the plurality of voltage control area has a substantially similar reactive reserve basin at the minimum of the corresponding reactive power versus voltage relationship.

3. The method of claim 1 wherein determining a corresponding reactive reserve basin comprises:

selecting the at least one of the voltage control areas whose buses therewithin have a voltage at the minimum of the corresponding reactive power versus voltage relationship which exceeds a voltage threshold; and selecting the at least one of the voltage control areas whose buses therewithin have a reactive margin at the minimum of the corresponding reactive power versus voltage relationship which is less than a reactive margin threshold.

4. The method of claim 3 wherein determining a corresponding reactive reserve basin further comprises selecting the at least one source of reactive reserves from the voltage control areas whose reactive reserves therewithin are depleted beyond a predetermined threshold at the predetermined operating point.

5. The method of claim 1 wherein the predetermined operating point is the minimum of the corresponding reactive power versus voltage relationship.

6. The method of claim 1 wherein the plurality of single contingencies comprises a single generator outage.

7. The method of claim 1 wherein the plurality of single contingencies comprises a single line outage.

8. The method of claim 1 wherein performing a multiple contingency analysis comprises:

varying a transfer pattern and level for the electric power transmission system; and varying a loading pattern and level for the electric power transmission system.

9. A method of performing a voltage stability assessment for a region of an electric power transmission system having a plurality of buses and a plurality of sources of reactive reserves coupled thereto, the method comprising:

grouping the plurality of buses into a plurality of voltage control areas such that each of the plurality of buses within each voltage control area has a similar corresponding reactive power versus voltage relationship;

selecting at least one of the voltage control areas whose buses therewithin have a voltage at the minimum of the corresponding reactive power versus voltage relationship which exceeds a voltage threshold;

determining a reactive reserve basin for the at least one of the plurality of voltage control areas, the reactive reserve basin comprising at least one of the sources of reactive reserves selected in dependence upon a measure of the depletion of reactive reserves at a predetermined operating point of the electric power transmission system;

performing a single contingency analysis by computing a corresponding quantity for each reactive reserve basin in response to each of a plurality of single contingencies, wherein the corresponding quantity is representative of a reduction in reactive reserves within the reactive reserve basin, and wherein the plurality of single contingencies includes at least one single generator outage and at least one single line outage;

selecting the single contingencies whose corresponding quantity exceeds a predetermined threshold; and assessing the voltage stability for single and multiple contingencies with a plurality of transfer and loading patterns, wherein the single and multiple contingencies are based upon the selected single contingencies.

* * * * *